US 6,728,610 B1

(12) United States Patent
Marshall et al.

(10) Patent No.: US 6,728,610 B1
(45) Date of Patent: Apr. 27, 2004

(54) METHODS AND SYSTEMS FOR PERFORMING MAINTENANCE SERVICES ON AIRCRAFT ENGINES

(75) Inventors: Albert T. Marshall, Cincinnati, OH (US); Henry G. Young, Jr., Morrow, OH (US)

(73) Assignee: General Electric Co., Schenectady, NY (US)

( * ) Notice: Subject to any disclaimer, the term of this patent is extended or adjusted under 35 U.S.C. 154(b) by 638 days.

(21) Appl. No.: 09/666,958

(22) Filed: Sep. 20, 2000

Related U.S. Application Data

(60) Provisional application No. 60/200,045, filed on Apr. 27, 2000.

(51) Int. Cl.$^7$ .............................................. G01M 17/00
(52) U.S. Cl. ........................................ 701/30; 701/29
(58) Field of Search ............................. 701/30, 29, 31, 701/32, 3; 340/500; 702/182, 185

(56) References Cited

U.S. PATENT DOCUMENTS

| 4,621,335 | A | | 11/1986 | Bluish et al. ................ 340/945 |
| 4,891,971 | A | | 1/1990 | Jones et al. ............... 731/117.3 |
| 6,067,486 | A | * | 5/2000 | Aragones et al. ............. 701/29 |
| 6,138,081 | A | | 10/2000 | Olejack et al. ............. 702/104 |
| 6,216,083 | B1 | | 4/2001 | Ulyanov et al. ............ 701/106 |
| 6,408,258 | B1 | * | 6/2002 | Richer ........................ 702/182 |

* cited by examiner

Primary Examiner—Marthe Y. Marc-Coleman
(74) Attorney, Agent, or Firm—William Scott Andes; Armstrong Teasdale LLP; Robert B. Reeser, III

(57) ABSTRACT

An engine maintenance system determines an "as flying" configuration of an aircraft engine and a desired configuration of the aircraft engine. The two configurations are compared to determine maintenance services to be performed on the aircraft engine.

26 Claims, 3 Drawing Sheets

METHODS AND SYSTEMS FOR PERFORMING MAINTENANCE SERVICES ON AIRCRAFT ENGINES

This application claims the benefit of Provisional application Ser. No. 60/200,045, filed Apr. 27, 2000.

BACKGROUND OF THE INVENTION

This invention relates generally to aircraft engines and, more particularly, to systems and methods for performing maintenance services on aircraft gas turbine engines.

Aircraft engine configurations often change after the engines are designed and before the engines enter production. Changes in design (CID) are common during both the design and production phases of the engine, but are not limited to these phases. After an aircraft engine is put in service, other engine configuration changes may occur. Aircraft engines typically include a plurality of components that are serviced at regular scheduled intervals. To perform servicing during such regular scheduled intervals, often the aircraft engine is disassembled to permit access to the components to be serviced. Such engine disassembly potentially requires that other components be replaced. As a result of frequent component replacements, often the current or "as flying" engine configuration is significantly different than either the "as designed" or "as produced" engine configurations.

Maintaining accurate engine maintenance servicing schedules and determining the maintenance services to be performed on the aircraft engine is difficult without knowing the current "as flying" engine configuration and service history of the particular engine. Scheduling is further complicated because numerous potential service providers may routinely perform maintenance servicing. As a result, and before maintenance services may be performed to an aircraft engine, a significant amount of time and labor may be expended disassembling the engine to determine the current engine configuration and thus, determine the replacement and serviceable engine components.

BRIEF SUMMARY OF THE INVENTION

In one embodiment, the present invention provides a method for gas turbine engine maintenance, such as maintenance of aircraft gas turbine engines. The method includes the steps of determining a "desired" configuration of the aircraft engine, determining an "as flying" configuration of the aircraft engine, and comparing the engine configurations to determine maintenance services to be performed on the aircraft engine. The step of determining the "as flying" configuration can be performed without disassembling the engine.

The "desired" and "as flying" configurations can be stored in one or more databases. The "as flying" configuration can be updated as maintenance is performed on the engine. The "desired" configuration can updated as design changes, maintenance procedures, production changes, and/or airworthiness directives are issued for the engine model. One or both of the configurations can be determined, at least in part, by querying a device associated with engine.

In one embodiment, the "as flying" configuration can be determined, at least in part, by querying bar codes associated with one or more engine components. Alternatively, or in combination with the use of such bar codes, the "as flying" configuration can be determined by querying microchips associated with one or more engine components.

In another embodiment, the present invention provides an engine maintenance system. The engine maintenance system can include a processor which is coupled, such as electronically, to an aircraft engine and programmed with a unique identifier corresponding to the aircraft engine. The processor can be coupled to a client system, which is, in turn, coupled to the engine. The client system is accessible from a server system configured to determine the "as flying" configuration of the engine. The server system can be programmed to query one or more databases to determine the difference between the "as flying" configuration and the "desired" configuration.

The engine maintenance system can include a communication interface which permits the server system to transmit and receive data from the client system. The communication interface can also permit a ground-based server system to access an airborne client system.

DETAILED DESCRIPTION OF THE INVENTION

Figure 1:
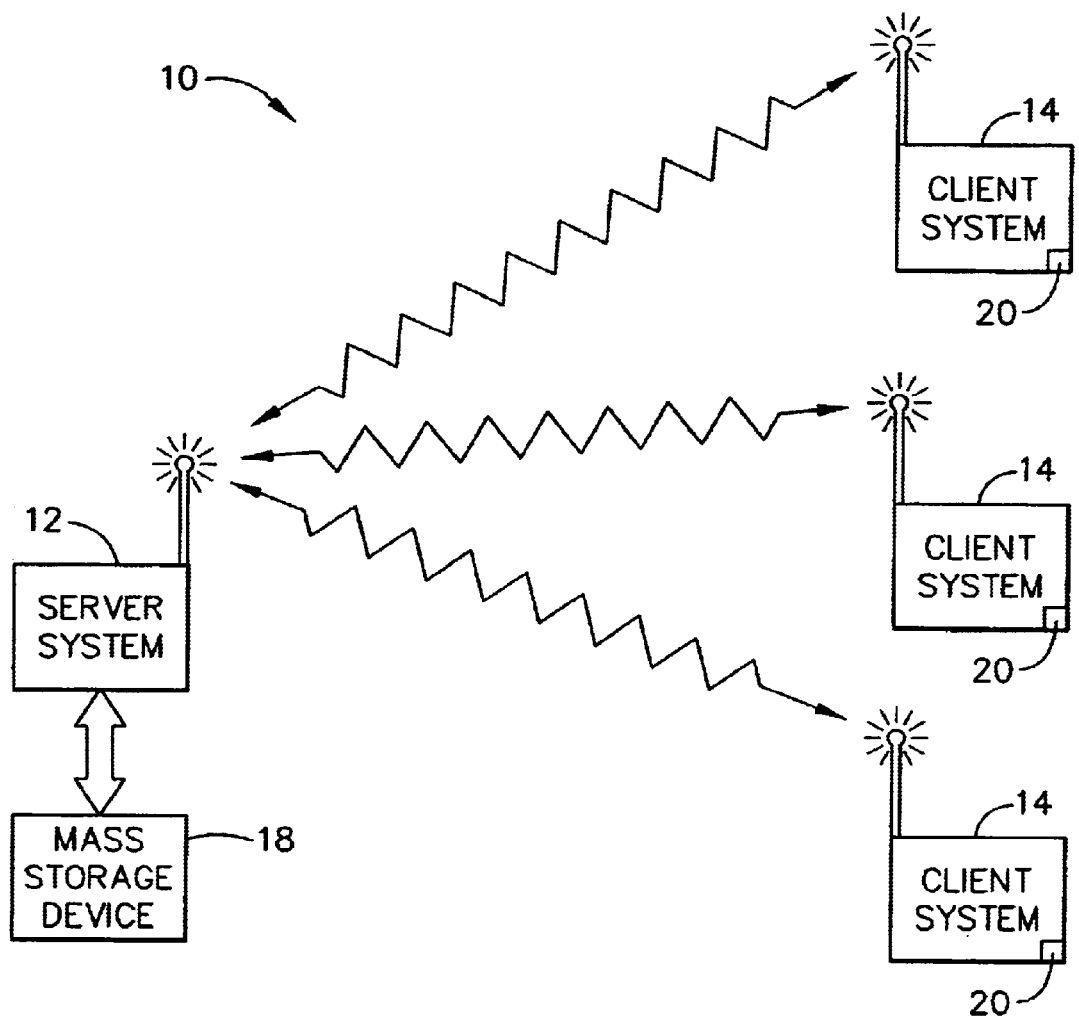
FIG. 1 is a block diagram of an aircraft engine maintenance system.

FIG. 1 is block diagram of an aircraft engine maintenance system 10 for determining maintenance services to be performed on an aircraft engine (not shown) in service. Aircraft engine maintenance system 10 includes a server system 12 coupled to a plurality of client systems 14 with a communications interface (not shown). The communications interface permits data to be exchanged between server system 12 and client systems 14. In one embodiment, the communication interface is a hard data connection extending between server system 12 and client systems 14. Alternatively, the communication interface is any wireless communication system that permits server system 12 to receive and transmit data with client systems 14, including a radio frequency interface. Server system 12 can also be coupled to a mass storage device 18. In one embodiment, server system 12 can be accessible via the Internet (or other computer network) and mass storage device 18 is accessible by potential users through server system 12. In another embodiment, the client system 14 can be accessible via the Internet (or other computer network), and mass storage device 18 is accessible by potential users through client system 14.

In one embodiment, client system 14 can be coupled to at least one aircraft engine and includes a processor 20 coupled to the engine with input/output circuitry (not shown). Processor 20 interfaces with operator controls and the aircraft engine via the input/output circuitry. The processor 20 can include a central processing unit (CPU), a random access memory (RAM), and a mass storage device. The processor 20 can be coupled, such as electronically, to an engine control system. For instance, but without limitation, the processor 20 can be coupled electronically to a full authority digital electronic control (FADEC) available from Lockheed Martin Control Systems, Johnson City, N.Y. The term "coupled" includes embodiments where the client system 14 and/or the processor 20 are permanently connected to or a part of the engine control system.

In an alternative embodiment, server system 12 can be coupled to at least one aircraft engine and can include a processor 20 coupled to the engine with input/output circuitry (not shown). Processor 20 interfaces with operator controls and the aircraft engine via the input/output circuitry. In this embodiment, processor 20 includes a central processing unit (CPU), a random access memory (RAM), and a mass storage device. The processor 20 can be electrically coupled to an engine control system, such as a full authority digital electronic control (FADEC) available from Lockheed Martin Control Systems, Johnson City, N.Y. The term "coupled" includes embodiments where the server system is permanently connected to or a part of the engine control system.

Information relating to components on the "as flying" engine can be determined by querying devices associated with the components. For example, in one embodiment the components and repair status of the components of the as flying engine can be determined, at least in part, by optically scanning or otherwise "reading" one or more devices associated with the components. In one embodiment, the "as flying" configuration can be determined, at least in part, by querying bar codes associated with one or more engine components. Alternatively, or in combination, programmable devices capable of storing, receiving, and/or sending data can be associated with one or more engine components. In one embodiment, microchips can be associated with the components, and can be queried by the maintenance system. For example, microchips known as "smart tags" can be attached to or otherwise associated with the components. Such microchips are manufactured by Motorola, Inc.

Figure 2:
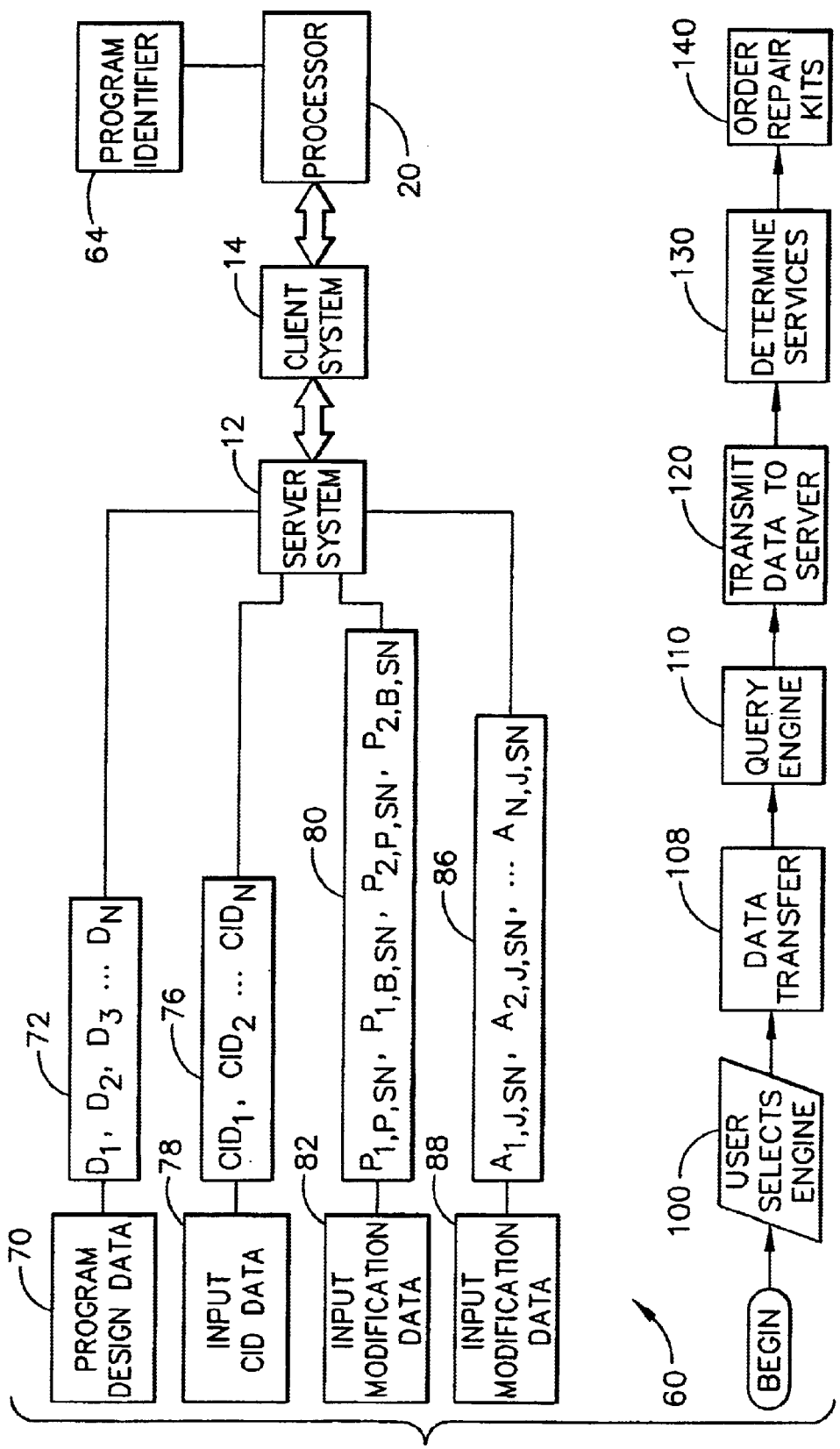
FIG. 2 is a flow chart of a method of determining maintenance services to be performed on an aircraft engine using the aircraft engine maintenance system shown in FIG. 1.

FIG. 2 is a flow chart of a method 60 for determining maintenance services to be performed on an aircraft engine (not shown). Method 60 may be practiced with aircraft engine maintenance system 10 (shown in FIG. 1), but is not limited to practice with system 10. Other systems with architectures different from a client-server architecture could be utilized in practicing method 60.

Specifically, referring now to FIG. 2, and in the context of practicing method 60 using system 10, processor 20 is initially programmed 64 to include a unique engine identifier including an engine serial number and a date of manufacture of the aircraft engine. The processor 20 can be coupled to client system 14 and the aircraft engine. Alternatively, processor 20 can be coupled to server system 12 and the aircraft engine. Server system 12 is programmed 70 with data 72 which can include data corresponding to an "as designed" $D_o$ configuration of the aircraft engine. Data 72 can include released detailed design information $D_1$, $D_2$, $D_3$ ... $D_n$ about the aircraft engine including engine component and constituent part information.

Aircraft engine components may be exchanged or improved prior to engine being delivered to a user. Additionally, engine components may be replaced if demanded by changes in engine operating parameters. Such component changes, known as changes in design (CID), affect a current state of the aircraft engine "as designed" configuration $D_o$. As a result, as CIDs occur, data 76, including design change information $CID_1$, $CID_2$, ... $CID_n$, can be input 78 into server system 12.

Additional modifications may occur during assembly of the aircraft engine. Such modifications may be as a result of additional CIDs or as a result of material review board (MRB) recommendations. Data 80, including modification information $P_{1,P,SN}$, $P_{1,B,SN}$, $P_{2,P,SN}$, ... $P_{N,P,SN}$, are input 82 into server system 12 and represent an "as produced" $P_{A,P,SN}$ configuration for the aircraft engine. The engine identifier references an actual "as produced" $P_{A,P,SN}$ engine configuration.

After the aircraft engine is delivered to the user and enters service, over time, maintenance service and additional components and constituent parts may be replaced on the aircraft engine, thus altering "as produced" $P_{A,P,SN}$ configuration for the aircraft engine. As a result, scheduled maintenance service projections and projected service dates may change depending on the component changes to the aircraft engine. Data 86, including modification information $A_{1,J,SN}$, $A_{2,J,SN}$ ... $A_{N,J,SN}$, are input 88 into server system 12 and represent an "as flying" $A_{N,J,SN}$ configuration for the aircraft engine.

To determine maintenance services to be performed on an aircraft engine, initially, a user selects 100 a specific aircraft engine to be analyzed from a list of engine serial numbers stored in mass storage device 18, and the selection is input into server system 12. Server system 12 is programmed to determine maintenance services using method 60. The engine selection is transmitted 108 through a communication interface (not shown) to client system 14 (shown in FIG. 1) and the aircraft engine is queried 110 with processor 20 to obtain the engine identifier data configuration for the aircraft engine. In one embodiment, processor 20 interfaces with an engine control, such as a FADEC system, to query the aircraft engine and receive a status update of the aircraft engine.

Data 72, 76, 80, and 86 is retrieved 120 from server system 12 after the engine identifier data configuration for the aircraft engine is entered into server system 12. Server system 12 then determines 130 maintenance services to be performed to the aircraft engine by comparing the current "as used" or "as flying" configuration of the engine with the desired configuration of the engine. To determine the maintenance services, the server system 12 can compare the "desired" configuration, with the "as flying" configuration. The "desired" configuration of a specific identified engine can include changes in design made to the engine model after the engine original design is complete, changes in design made after production of the engine commences, changes in design made after the engine has been delivered to a customer and enters service, and changes made due to service bulletins, government agency actions, changes in repair procedures, and changes in maintenance schedules or procedures.

After determining specific components needing maintenance service, e.g., by comparing the engine status with pre-loaded maintenance schedules, server system 12 is electrically connected to an inventory management system (not shown) and automatically determines 140 appropriate repair parts or kits (not shown) to request for servicing the aircraft engine. As a result, supply chain demand and inventory management are employed to develop an optimal repair kit for servicing the aircraft engine. Furthermore, service part inventories are minimized at servicing locations and turn-around-time (TAT) for aircraft engines receiving maintenance is reduced in comparison to known aircraft engine maintenance scheduling programs.

The above-described method for determining maintenance services for at least one aircraft engine is cost-effective and highly reliable. The server system executing the method determines an extent of maintenance services for an aircraft engine by querying the aircraft engine to receive an "as flying" configuration for the engine. The engine includes a processor which permits the "as flying" configuration to be continually updated such that a current configuration is provided to the server system. The server system compares the current state of the "as flying" configuration to desired engine configuration (updated on an ongoing basis to include changes such as changes in design, changes in production, changes in repair and service procedures, and airworthiness directives from government agencies) to determine the components on the aircraft engine requiring maintenance. Because the server system is able to determine such components, the extent of maintenance service is easily determined in a cost-effective manner. Additionally, maintenance service can be scheduled more cost-effectively by tracking changes in the "desired" configuration relative to the "as flying" configuration, and scheduling maintenance to maximize the number of maintenance operations performed for a given shop visit.

Figure 3:
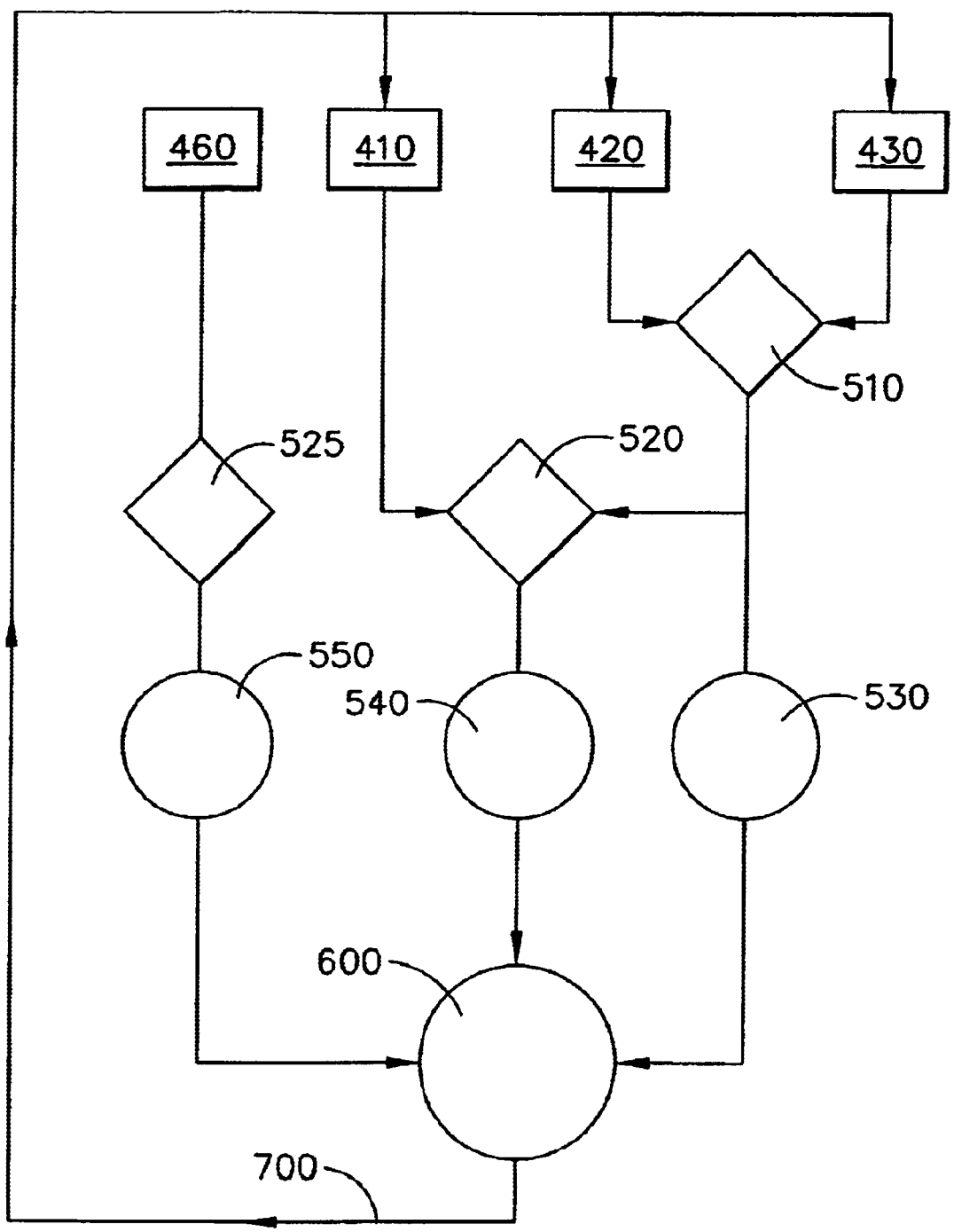
FIG. 3 is a flow chart illustrating a method of determining maintenance services to be performed on an aircraft engine.

FIG. 3 is a flow diagram illustrating a method of determining maintenance services according to an embodiment of the present invention. In FIG. 3, a maintenance schedule database is designated by numeral 410, an "as flying" engine configuration database is designated by numeral 420, and a "desired" engine configuration database is designated by numeral 430. The aircraft maintenance system can compare at 510 the "desired" configuration with the "as flying" configuration. If differences are determined to exist, one or more configuration change actions 530 (e.g., repair or replace component) can be identified. In parallel, the maintenance schedule database 410 can be reviewed at 520 with the engine operating time or other parameters to determine scheduled maintenance actions 540. The maintenance system can also include an event database 460 for receiving inflight engine performance data (e.g. temperature, pressure, speed information). The inflight performance data in database 460 can be reviewed with respect to baseline engine performance data at 525 to identify nonscheduled maintenance actions 550.

The maintenance system can utilize the identified configuration change actions 530, the scheduled maintenance actions 540, and the nonscheduled maintenance actions 550 to determine at 600 a maintenance plan of action. The maintenance plan of action can include triggering supply chain actions, such as part orders, for obtaining needed spare parts, and scheduling groups of related maintenance actions together at cost effective intervals while meeting aircraft engine safety regulations. As the maintenance plan of action is executed, the appropriate databases 410, 420, and 430 can be updated, as indicated by feedback path numeral 700.

While the invention has been described in terms of various specific embodiments, those skilled in the art will recognize that the invention can be practiced with modification within the spirit and scope of the claims. The invention has been described in terms of aircraft engine maintenance, in particular gas turbine aircraft maintenance, but is also applicable to other non-aircraft engine and powerplant maintenance, including maintenance of power generation equipment.

What is claimed is:

1. A method for determining maintenance services to be performed on an aircraft engine, the method comprising the steps of:

determining a desired configuration of the aircraft engine, including at least one of changes in design made to the aircraft engine after the engine original design is complete, changes in design made after production of the aircraft engine commences, changes in design made after the aircraft engine has been delivered to the customer and enters service, changes made due to service bulletins, changes made due to government agency actions, changes in repair procedures, and changes made to maintenance schedules or procedures;

determining an "as flying" configuration of the aircraft engine without disassembling the engine; and comparing the engine configurations to determine maintenance services to be performed on the aircraft engine.

2. The method of claim 1 wherein the step of determining the desired configuration of the aircraft includes obtaining information from one or more databases.

3. The method of claim 1 wherein the step of determining the "as flying" configuration of the aircraft includes obtaining information from one or more databases.

4. The method of claim 1 wherein the step of determining at least one of the is desired and "as flying" configurations comprises determining a unique identifier for the engine.

5. The method of claim 1 comprising the step of comparing at least one of the engine configurations to a maintenance schedule to determine maintenance services to be performed on the aircraft engine.

6. The method of claim 1 wherein the step of determining the "as flying" configuration comprises querying a device associated with the engine.

7. The method of claim 6 comprising querying at least one bar code associated with a component on the engine.

8. The method of claim 6 comprising querying at least one microchip associated with a component on the engine.

9. The method of claim 6 wherein the step of determining the "as flying configuration" comprises querying a device coupled to the aircraft engine with an aircraft engine maintenance system to determine an "as flying" configuration of the aircraft engine.

10. The method of claim 6 wherein said step of querying a device further comprises the step of determining an identifier for the engine including a serial number for the engine and a date of manufacture of the aircraft engine.

11. The method of claim 6 wherein the step of querying a device comprises the use of a wireless communication interface.

12. The method of claim 6 wherein the step of querying a device comprises querying a client system coupled to the aircraft engine.

13. The method of claim 6 wherein the step of querying a device comprises the step of accessing a server system coupled to the aircraft engine.

14. A maintenance system for determining maintenance services to be performed on an aircraft engine, the maintenance system adapted to determine an "as flying" configuration of the engine without disassembly of the engine by querying a processor coupled to the engine such that said processor interfaces with at least one of the engine operator controls and the aircraft engine via input/output circuitry, and the maintenance system adapted to compare the "as flying" configuration with a desired engine configuration for determining maintenance services to be performed on the engine.

15. An apparatus in accordance with claim 14 further configured to determine an identifier for the aircraft engine including a serial number for the aircraft engine and a date of manufacture of the aircraft engine.

16. An apparatus in accordance with claim 14 further comprising a communications interface.

17. An apparatus in accordance with claim 16 wherein said communications interface is a radio frequency interface.

18. The apparatus of claim 14 wherein at least one of the configurations is stored on one or more databases.

19. An apparatus in accordance with claim 14 wherein said apparatus comprises a server system.

20. An apparatus in accordance with claim 19 wherein said server system configured to query a client system coupled to the aircraft engine.

21. An apparatus in accordance with claim 14 wherein said apparatus comprises a client system.

22. An apparatus in accordance with claim 21 wherein said client system is configured to query a server system coupled to the aircraft engine.

23. An engine maintenance system for determining maintenance services to be performed on an aircraft engine, said engine maintenance system comprising:
- a mass storage device;
- a server system; and
- a client system configured to couple to said server system, at least one of said client system and said server system programmed to determine a desired engine configuration, and at least one of said client system and said server system programmed to determine an "as flying" configuration of the aircraft engine by at least one of direct electronic data transfer from said engine and electronic scanning of said engine.

24. An engine maintenance system in accordance with claim 23 wherein at least one of said client system and said server system programmed to determine a serial number and a date of manufacture for the engine.

25. An engine maintenance system in accordance with claim 23 further comprising a communications interface, said server system coupled to the aircraft engine, said client system configured to access said server system via said communications interface.

26. A method for determining maintenance services to be performed on power generating equipment, the method comprising the steps of:
- determining a desired configuration of the power generating equipment, including at least one of changes in design made to the equipment the equipment original design is complete, changes in design made after production of the equipment commences, changes in design made after the equipment has been delivered to the customer and enters service, changes made due to service bulletins, changes made due to government agency actions, changes in repair procedures, and changes made to maintenance schedules or procedures;
- determining an "as used" configuration of the equipment without disassembling the equipment; and
- comparing the configurations to determine maintenance services to be performed on the equipment.

* * * * *